United States Patent [19]
Yamazaki et al.

[11] Patent Number: 5,886,851
[45] Date of Patent: Mar. 23, 1999

[54] FRAME STRUCTURE OF A DISK DRIVE FOR IMPROVED HEAT DISSIPATION AND A DISK DRIVE THAT USES SUCH A FRAME STRUCTURE

[75] Inventors: Osamu Yamazaki; Yoshiaki Nagasawa; Katsuaki Ishida, all of Kanagawa; Tomoo Sukagawa, Yamagata, all of Japan

[73] Assignee: Fujitsu Limited, Kawasaki, Japan

[21] Appl. No.: 630,026

[22] Filed: Apr. 9, 1996

Related U.S. Application Data

[63] Continuation of Ser. No. 316,228, Sep. 30, 1994, abandoned.

[30] Foreign Application Priority Data

Jan. 14, 1994 [JP] Japan ................................ 6-002428

[51] Int. Cl.$^6$ .................................................. G11B 33/14
[52] U.S. Cl. ............................................. 360/97.02
[58] Field of Search ............................ 360/97.01, 97.02, 360/97.03, 97.04; 369/247, 248; 361/684, 685, 687, 683

[56] References Cited

U.S. PATENT DOCUMENTS

| | | | |
|---|---|---|---|
| 4,812,932 | 3/1989 | Hishinuma et al. | 360/97.01 |
| 4,980,786 | 12/1990 | O'Sullivan et al. | 360/97.03 |
| 4,997,032 | 3/1991 | Danielson et al. | 165/46 |
| 5,079,655 | 1/1992 | Yagi | 360/97.02 |
| 5,214,549 | 5/1993 | Baker et al. | 360/97.02 |
| 5,237,486 | 8/1993 | LaPointe et al. | 361/681 |
| 5,331,510 | 7/1994 | Ouchi et al. | 361/702 |
| 5,349,486 | 9/1994 | Sugimoto et al. | 360/97.03 |
| 5,351,176 | 9/1994 | Smith Stephen W. et al. | 361/681 |

FOREIGN PATENT DOCUMENTS

| | | | |
|---|---|---|---|
| 55-125699 | 9/1980 | Japan . | |
| 56-3472 | 1/1981 | Japan | 360/97.02 |
| 56-19694 | 2/1981 | Japan . | |
| 56-167377 | 12/1981 | Japan . | |
| 58-201397 | 11/1983 | Japan . | |
| 62-52989 | 4/1987 | Japan . | |
| 1-178252 | 12/1989 | Japan . | |
| 3-83281 | 4/1991 | Japan | 360/97.02 |

*Primary Examiner*—David L. Ometz
*Attorney, Agent, or Firm*—Greer, Burns & Crain, Ltd.

[57] ABSTRACT

A disk drive includes a disk drive housing and a frame that supports the disk drive housing, wherein a thermally conductive elastic member is interposed between the disk drive housing and the frame for conducting heat in the disk drive housing to the frame and for isolating vibration.

17 Claims, 8 Drawing Sheets

FRAME STRUCTURE OF A DISK DRIVE FOR IMPROVED HEAT DISSIPATION AND A DISK DRIVE THAT USES SUCH A FRAME STRUCTURE

This application is a continuation of copending application Ser. No. 08/316,228 filed on Sep. 30, 1994, now abandoned.

BACKGROUND OF THE INVENTION

The present invention generally relates to disk drives and more particularly to a frame structure of a disk drive that has a movable head or pickup.

In recent high-speed disk drives such as a magnetic disk drive called a hard disk drive, which carries information on a rigid magnetic disk, the speed of revolution of the disk is increasing for faster operation. Associated with this, the speed of movement of an actuator that carries a head is also increasing. In such high-speed disk drives, there is a keen demand for an improved design for efficient heat dissipation as well as for efficient suppression of vibration associated with such a high speed operation of the disk drive.

Typically, a magnetic disk drive has an actuator arm for carrying a magnetic head such that the magnetic head floats from the surface of the revolving magnetic disk by means of a thin air foil. By swinging the actuator arm back and forth about a swing axle, the magnetic head scans over the surface of the magnetic disk generally in a radial direction thereof.

Figure 1:
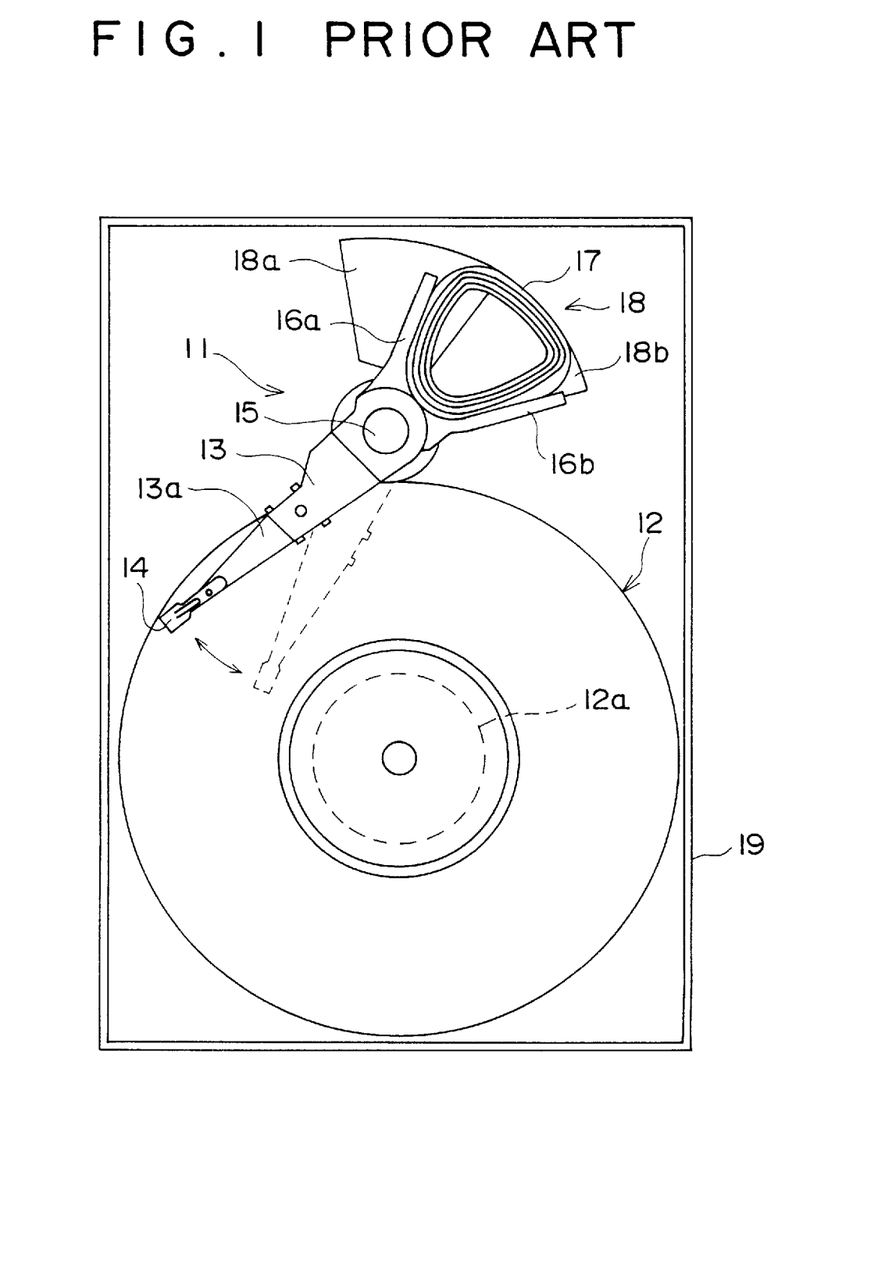
FIG. 1 is a diagram showing the construction of a conventional magnetic disk drive in a plan view.

FIG. 1 shows the construction of a typical conventional magnetic disk drive in a plan view.

Referring to FIG. 1, it will be noted that the magnetic disk drive includes an actuator 11 and a magnetic disk 12, wherein the actuator 11 carries an arm 13 that in turn supports a magnetic head 14 at a distal end thereof via a spring mechanism 13a. It should be noted that the arm 13 has a base part thereof held rotatably by a pivot mechanism 15 and swings back and forth about a swing axle of the pivot mechanism 15.

At the other end of the arm 13, there are formed support members 16a and 16b for holding a coil 17, and a pair of magnets 18a and 18b are disposed below the coil 17 with respective, opposite magnetic polarities. The magnets 18a and 18b are fixed on a chassis of the magnetic disk drive and form a voice coil motor 18 together with the coil 17.

The magnetic disk 12 is revolved by means of a spindle motor 12a, and the actuator 11 causes a scanning of the magnetic head 14 over the surface of the revolving magnetic disk 12 generally in a radial direction of the disk 12 in response to the energization of the coil 17. It should be noted that the actuator 11 is disposed on both sides of the magnetic disk 12, while the magnetic disk 12 is provided in plural numbers on a common drive axis such that the magnetic disks are revolved simultaneously and coaxially by the spindle motor 12a. The magnetic disks 12 and the actuators 11 are hermetically sealed by an enclosure or housing 19.

In recent magnetic disk drives, the speed of revolution of the spindle motor 12a is increasing for increased operational speed and reduced access time. Associated with such an increased speed of the magnetic disks, there is a demand for increased speed of movement of the actuators 11.

When the speed of movement of the actuator 11 is increased as such, there arises a problem of temperature rise in the hermetically sealed interior of the magnetic disk drive. Thus, there is provided a heat sink on the housing of the magnetic disk drive for dissipating heat. Further, the magnetic disk drive is mounted upon a frame for insulating vibration. Further, it should be noted that a plurality of such magnetic disk drives are assembled to form a disk module that provides a large storage capacity, several times as large as the storage capacity of the single magnetic disk drive.

Figure 2A:
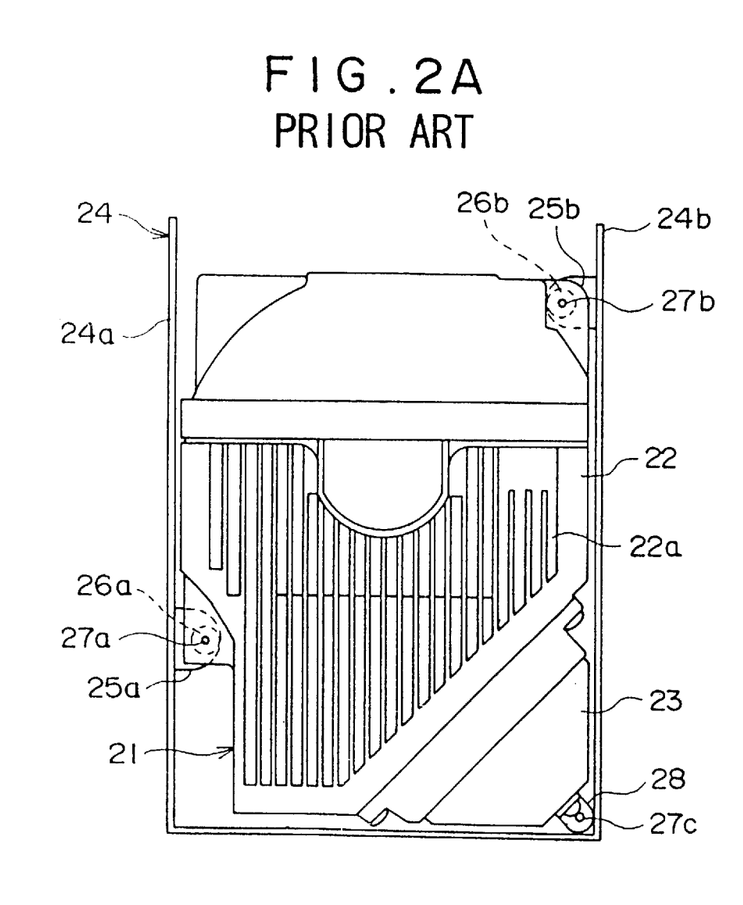
FIGS. 2A and 2B are diagrams showing the construction of a conventional magnetic disk drive.
Figure 2B:
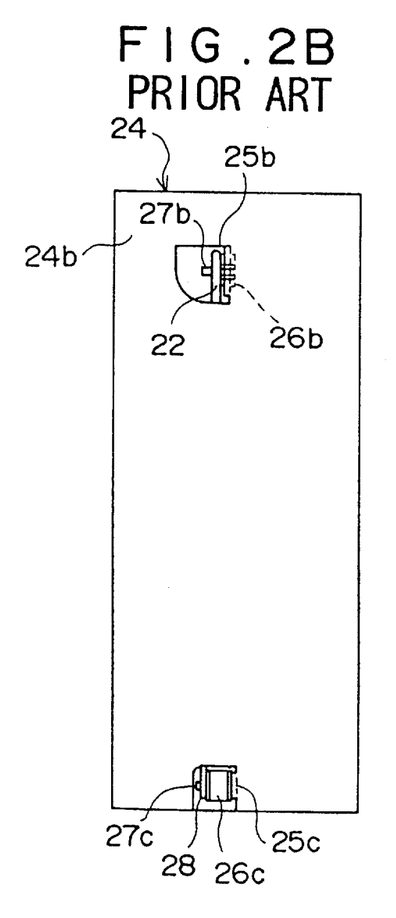

FIGS. 2A and 2B show the construction of the frame structure used in conventional magnetic disk drives, wherein FIG. 2A shows a plane view while FIG. 2B shows a side view.

Referring to FIGS. 2A and 2B, it should be noted that a magnetic disk drive 21 is accommodated in a housing part 22, while the voice coil motor 18 that forms the essential part of the actuator mechanism 11 described previously, is covered by a another housing part 23. Further, FIG. 2A shows a heat sink structure 22a that includes a number of heat radiation fins for efficient dissipation of heat. The housing part 22 and the housing part 23 are connected with each other and form a hermetically sealed housing in which the rotary magnetic disks 12 and the actuators 11 are accommodated.

The magnetic disk drive 21 is mounted upon a U-shaped frame 24 that includes a pair of side plates 24a and 24b opposing each other, wherein the side plate 24a is provided with a support flange 25a as a part of the side plate 24a cut and bent inwardly. Similarly, the side plate 24b is provided with support flanges 25b and 25c as a part of the side plate 24b cut and bent inwardly. As will be described in detail below with reference to FIGS. 3A and 3B, the support flanges 25a and 25b carry respective vibration insulators 26a and 26b and support the housing part 22 of the magnetic disk drive via the vibration insulators 26a and 26b. Similarly, the support flange 25c carries a vibration insulator 26c and support the housing part 23 of the magnetic disk drive via the vibration insulator 26c. Thereby, the housing part 22 is fixed upon the support flanges 25a and 25b by way of screws 27a and 27b, while the housing part 23 is fixed upon the support flange 25c by way of a screw 27c and a mount bracket 28 attached to the housing part 23.

Figure 3A:
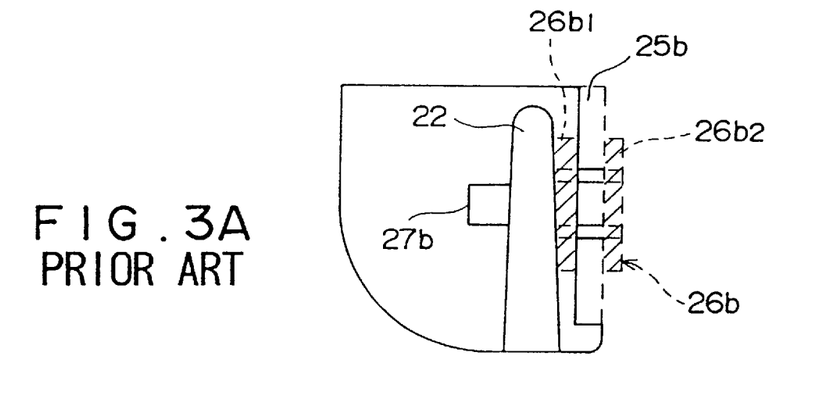
FIGS. 3A and 3B are diagrams showing the construction of a frame used in a conventional magnetic disk drive.
Figure 3B:
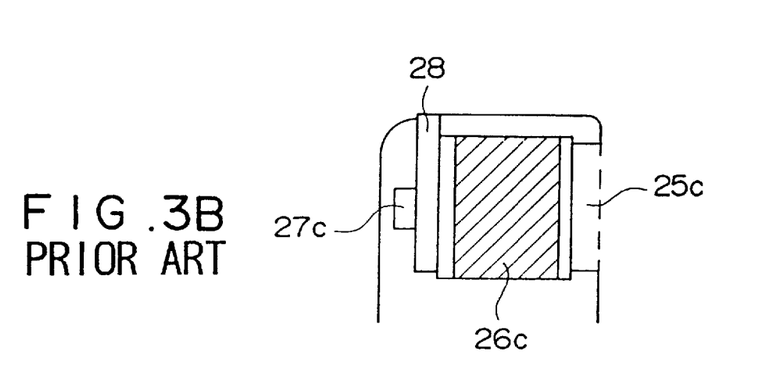

FIGS. 3A and 3B show the support flanges 25b and 25c in detail.

Referring to FIG. 3A, it will be noted that the vibration insulator is formed of a rubber sleeve having upper and lower rubber flanges $26b_1$ and $26b_2$ disposed at both sides of the support flange 25b, and the screw 27b is threaded into the support flange 25b through the sleeve of the vibration insulator 26b for fixing the housing 22 of the magnetic disk drive. Similarly, the housing 22 is mounted upon the support flange 25c by means of the screw 27c and the bracket 28, such that a rubber member acting as the vibration insulator 26c is interposed between the bracket 28 and the support point 25c.

The magnetic disk drive having such a conventional construction dissipates the heat generated inside the housing 22 by way of the heat radiation fins 22a on the housing 22. Further, the vibration caused by the spindle motor 12 or the voice coil motor 18 is suppressed by way of the vibration insulators 26a–26c. It should be noted that a plurality of magnetic disk drives each having a construction of the magnetic disk drive 21 are mounted upon corresponding frames 24, and such a plurality of the magnetic disk drives form the magnetic disk module mentioned previously.

In the recent high-speed disk drives, however, such a conventional construction of the housing 22 for heat dissipation is not sufficient for suppressing the temperature rise inside the housing 22. As a result of excessive temperature rise, conventional high-speed disk drives have suffered from the problems such as increased off-track, damaging or deterioration of mechanical parts such as bearings or flexible printed circuit boards, as well as deterioration in performance of the integrated circuits provided inside the housing 22. When forced-air-cooling is employed for eliminating this problem, on the other hand, one encounters a problem of excessive cost of the device. Thus, the problems pertinent to such conventional magnetic disk drives urge the development of a further improved design of vibration insulation that is also effective for efficient heat dissipation.

SUMMARY OF THE INVENTION

Accordingly, it is a general object of the present invention to provide a novel and useful magnetic disk drive wherein the foregoing problems are eliminated.

Another and more specific object of the present invention is to provide a magnetic disk drive having an improved frame structure for suppressing vibration and increasing the efficiency of heat radiation.

Another object of the present invention is to provide a disk drive for storing information, comprising:

a rotatable medium having a recording surface for recording information;

a spindle motor for causing a rotation of said rotatable medium;

a head for scanning over said recording surface of said rotatable medium, said head causing a recording and/or reproduction of information on and from said recording surface of said rotatable medium;

an actuator mechanism for causing said head to scan over said recording surface of said recording medium;

a housing for enclosing at least said rotatable medium and said head hermetically;

a frame for holding said housing; and a thermally conductive elastic member interposed between said housing and said frame for absorbing vibration, said thermally conductive elastic member contacting said housing and further contacting said frame for conducting heat inside said housing to said frame.

Another object of the present invention is to provide a frame structure of a disk drive, comprising:

a housing for accommodating therein: a rotatable medium that carries information on a recording surface; a head for scanning said recording surface, said head causing a recording and/or reproduction of information on and from said recording surface of said rotatable medium; and an actuator mechanism for causing said head to scan over said recording surface of said recording medium;

a frame for holding said housing; and a thermally conductive elastic member interposed between said housing and said frame for absorbing vibration, said thermally conductive elastic member further conducting heat inside said housing to said frame.

According to the present invention, the thermally conductive elastic member efficiently dissipates the heat generated in the housing by the actuator mechanism to the frame, while simultaneously absorbing vibration caused inside the housing by the actuator mechanism or revolving disk. Thereby, excessive temperature rise of the disk drive is successfully avoided.

In a preferred embodiment of the present invention, said thermally conductive elastic member is further provided to fill a space formed between said housing and said frame. According to the present embodiment as set forth above, the efficiency of heat dissipation is improved further as a result of increased area of contact of the thermally conductive elastic member with the housing and the frame. Further, the efficiency of acoustic insulation of the magnetic disk drive is improved, including improved suppression of acoustic noise caused by the movement of the actuator mechanism inside the housing.

In another preferred embodiment of the present invention, said housing comprises a first housing part for covering said rotatable medium and a second, separate housing part for covering said actuator mechanism, said first housing part and said second housing part forming together a hermetically sealed space corresponding to said housing, for accommodating said rotary recording medium and said actuator mechanism therein.

In a more preferred embodiment of the present invention, each of said first and second housing parts is mounted upon a corresponding support point of said frame via a vibration insulator, and wherein said thermally conductive elastic member fills a space formed between said second housing part and said frame. According to the foregoing preferred embodiments that employ the second housing part separated from the first housing part as set forth above, it should be noted that the second housing part that covers the part of the disk drive where the heat generation occurs most strongly is effectively cooled by way of the thermally conductive elastic member.

In another preferred embodiment of the present invention, said thermally conductive elastic member is formed of an acoustic insulating material. According to the present invention as set forth above, the acoustic noise caused inside the housing of the disk drive is effectively insulated.

Other objects and further features of the present invention will become apparent from the following detailed description when read in conjunction with the attached drawings.

DETAILED DESCRIPTION OF THE PREFERRED EMBODIMENTS

Figure 4A:
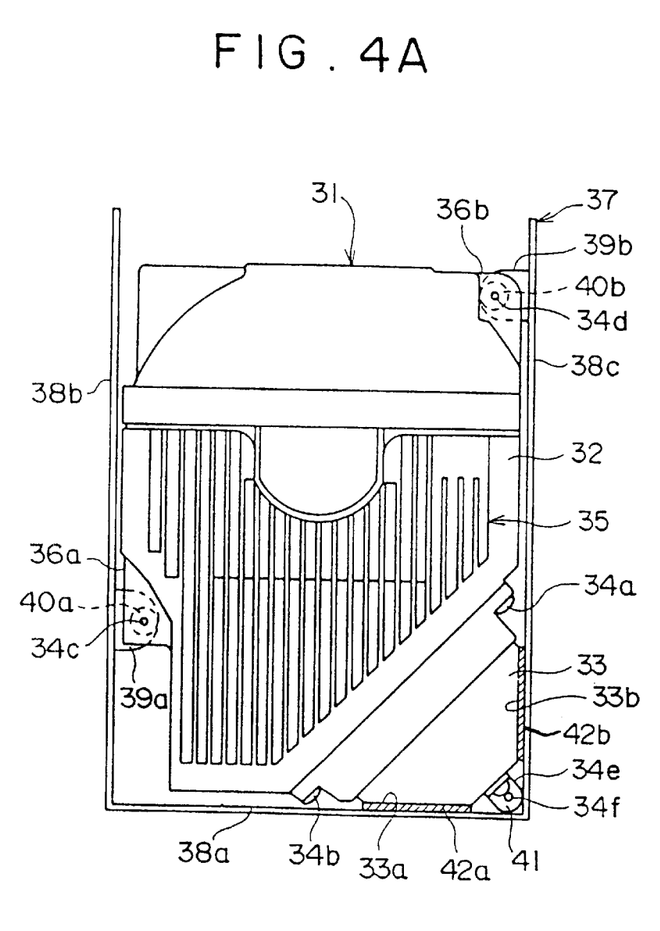
FIGS. 4A and 4B are diagrams showing a magnetic disk drive according to a first embodiment of the present invention respectively in a plan view and a side view.
Figure 4B:
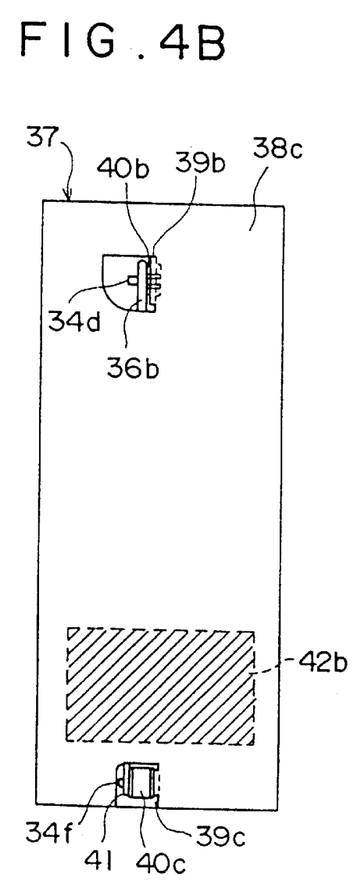

FIGS. 4A and 4B show a magnetic disk drive 31 according to a first embodiment of the present invention, wherein FIG. 4A shows the magnetic disk drive in a plan view while FIG. 4B shows the same magnetic disk drive in a side view.

Referring to FIGS. 4A and 4B, the magnetic disk drive 31 has a similar internal construction described with reference to FIG. 1 and includes the magnetic disk 12 and the actuator mechanism 11 as well as the spindle motor 12a for driving the magnetic disk 12, wherein the magnetic disk 12, the actuator mechanism 11 and the spindle motor 12a are accommodated in a hermetically sealed housing that is formed of a first housing member 32 and a second housing member 33. The first housing member 32 is formed of a thermally conductive material such as die-cast aluminum or equivalents thereof and accommodates therein the magnetic disk 12. On the other hand, the second housing member 33 is formed of a thermally conductive material such as a magnetic steel or equivalents thereof and accommodates therein the voice coil motor 18. The first and second housing members 32 and 33 are connected with each other by means of screws 34a and 34b to form the foregoing hermetically sealed housing. The housing thus assembled is mounted upon a frame 37 of the magnetic disk drive 31 as will be described below. The first housing member 32 carries a heat sink structure 35 thereon including a number of heat radiation fins for radiating heat, wherein the heat sink structure 35 is formed integrally to the housing member 32 by way of die-casting of aluminum.

It should be noted that the first housing member 32 has flange parts 36a and 36b used for mounting the housing member 32 upon the frame 37, wherein the flange parts 36a and 36b are formed integrally to the housing member 32 by the die-casting process. On the other hand, the housing member 33 carries an L-shaped bracket 41 mounted upon the housing member 33 by a screw 34e, wherein the L-shaped bracket 41 is used for mounting the housing member 33 upon the frame 37.

Figure 5A:
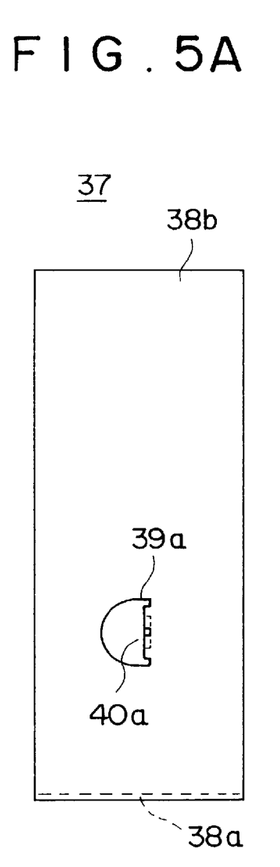
FIGS. 5A–5C are diagrams showing a frame structure used in the construction of FIGS. 4A and 4B.
Figure 5B:
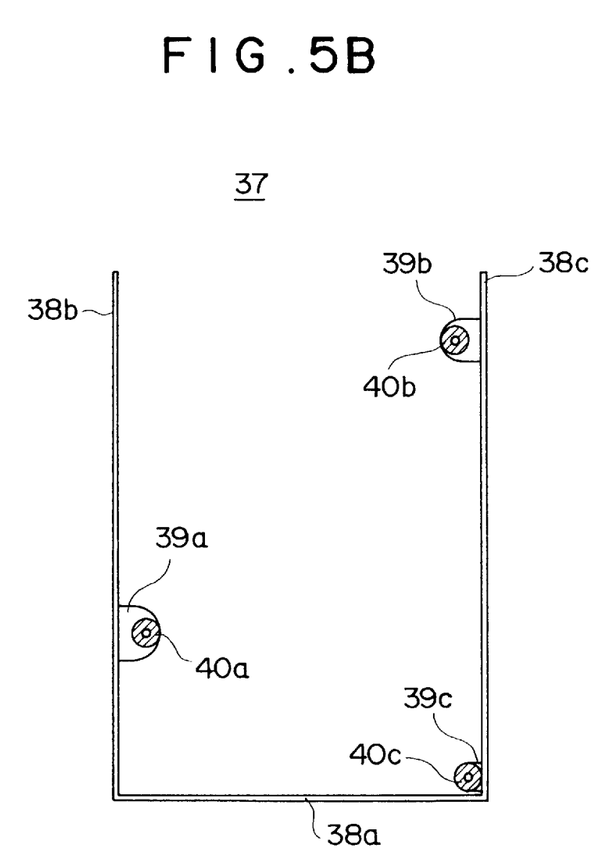
Figure 5C:
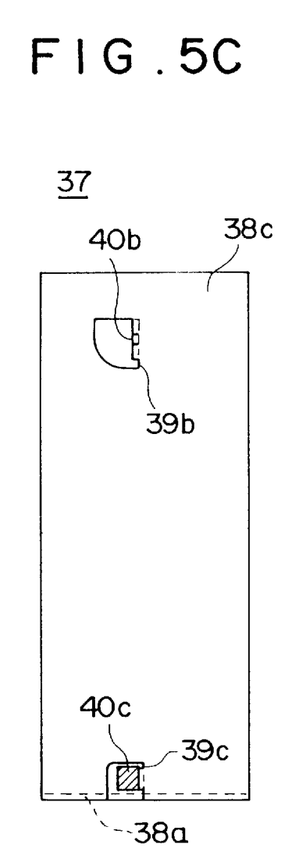

Next, the frame 37 will be described with reference to FIGS. 5A–5C, wherein FIG. 5A shows the frame 37 in a left-side view, FIG. 5B shows the frame 37 in a plan view, while FIG. 5C shows the frame 37 in a right-side view.

Referring to FIGS. 5A–5C, the frame 37 is typically formed by a rolled steel plate or equivalent thereof and has a generally U-shaped form. More specifically, the frame 37 includes a front plate 38a and a pair of mutually opposing side plates 38b and 38c extending from both sides of the front plate 38a, wherein the side plate 38b carries a support flange 39a formed at an intermediate height of the plate 38b in correspondence to the foregoing flange part 36a of the first housing member 32. Similarly, the side plate 38c carries a pair of support flanges 39b and 39c at an intermediate height of the plate 38c in correspondence to the foregoing flange part 39b and the L-shaped bracket 41. It should be noted that the support flange 39a is formed by providing a semi-circular or rectangular cut in the side wall 38b of the frame 37 and bending the cut thus formed to the inside of the frame 37. Similarly, the support flanges 39b and 39c are formed by providing a U-shaped or rectangular cut and bending the same to the inside of the frame 37. Thereby, the upper surfaces of the support flanges 39a–39c support the corresponding flange parts 36a and 36b of the housing member 32 as well as the L-shaped bracket 41 of the housing member 33 generally at the central level of the frame 37.

It should be noted that the support flanges 39a–39c carry vibration insulators 40a–40c respectively, wherein each of the vibration insulators 40a–40c is formed of a rubber sleeve or an equivalent thereof and has a penetrating hole passing therethrough similar to the vibration insulator 26b shown in FIG. 3A. Thus, the vibration insulators 40a–40c are attached to the corresponding support flanges 39a–39c. Thus, the housing of the magnetic disk drive 31 is held upon the support flanges 39a–39c via the vibration insulators 40a–40c and is fixed thereto by means of screws 34c, 34d and 34f that pass through the foregoing penetrating holes provided in the vibration insulators 40a–40c. By adjusting the thickness of the vibration insulators 40a–40c, it is possible to adjust the level of the magnetic disk drive with respect to the height of the frame 37.

Referring to FIGS. 4A and 4B again, it will be noted that the side of the housing member 33 that covers the voice coil motor 18 is provided with thermally conductive elastic members 42a and 42b. More specifically, the elastic member 42a is attached to a surface 33a of the housing member 33 that faces the front plate 38a of the frame 37 by adhesive. Similarly, the elastic member 42b is attached to a surface 33b of the housing member 33 that faces the side plate 38c of the frame 37 by adhesive. The elastic members 42a and 42b thereby engage mechanically and intimately with the corresponding plates 38a and 38c of the frame 37 and transfer the heat generated in the housing member 33 by the voice coil motor 18 to the frame 37 efficiently. Further, the thermally conductive elastic members 42a and 42b absorb mechanical vibration. Thus, the construction of FIGS. 4A and 4B is effective for improving the cooling of the magnetic disk drive and simultaneously for insulating the magnetic disk drive from external vibration or shock. Furthermore, such a construction is effective for insulating the acoustic noise caused inside the housing of the magnetic disk drive as a result of activation of the actuator 11.

As a material for the thermally conductive elastic members 42a and 42b, it is preferable to use a silicone rubber composite admixed with ceramics such as "TRI cool touch FC sheet FC2500" (trade name) available from Tokai Rubber Company. The foregoing FC sheet has a thermal conductivity of 1.26 w/m·° C., which is about six times as large as the thermal conductivity of general purpose rubber, which is about 0.2 w/m·° C. The FC sheet is elastic and suitable for absorbing vibration. Further, the FC sheet is effective for insulating acoustic noise. Furthermore, the FC sheet is insulative and shows a resistivity of $1 \times 10^{-15}$ Ωcm.

Figure 6A:
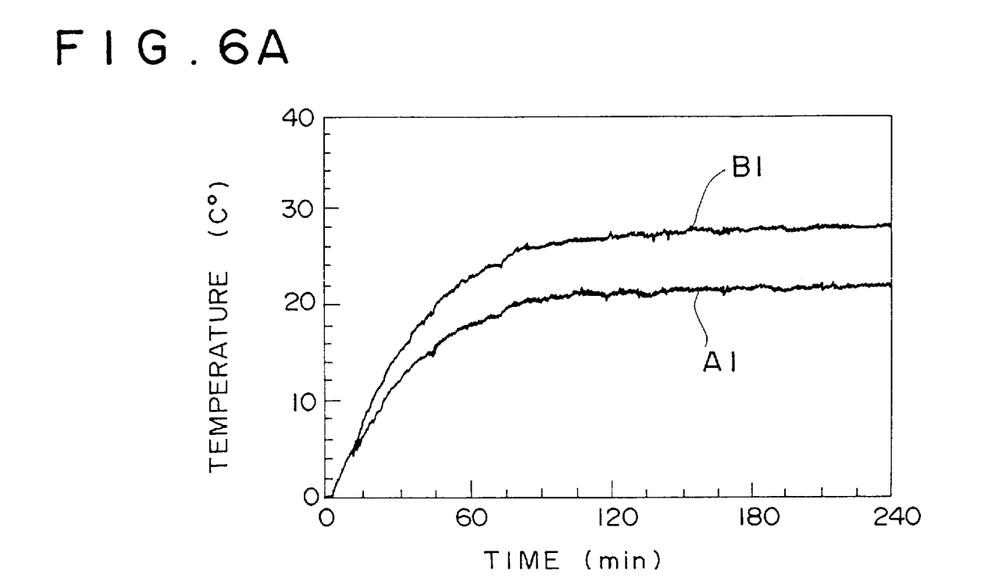
FIGS. 6A and 6B are diagrams showing the temperature profile realized in the magnetic disk drive of FIGS. 4A and 4B.
Figure 6B:
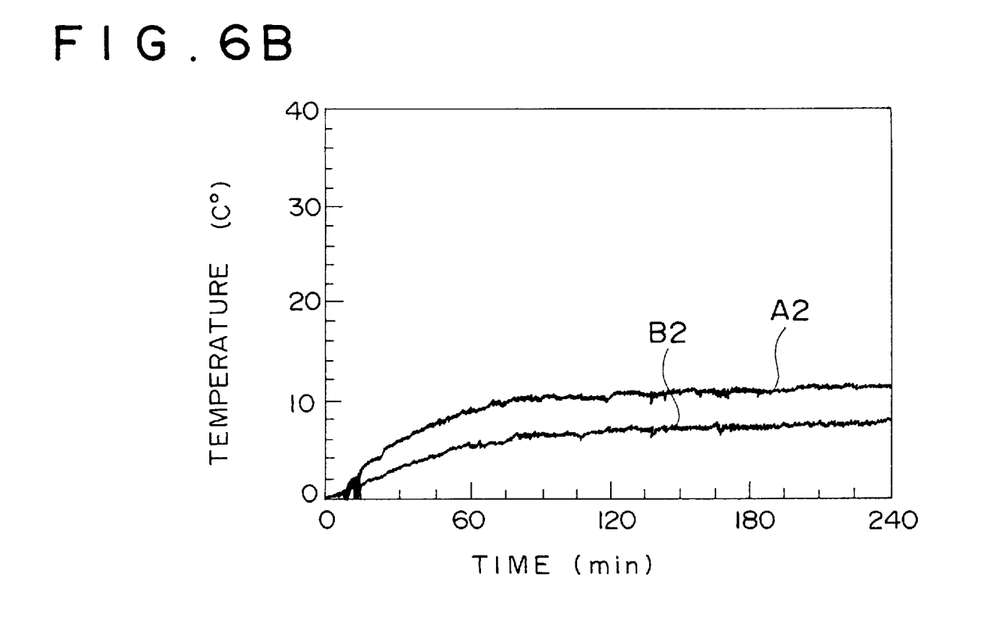

FIGS. 6A and 6B show the temperature rise of the magnetic disk drive of the present invention shown in FIGS. 4A and 4B as a function of time, wherein FIG. 6A shows the temperature rise of the housing member 33, while FIG. 6B shows the temperature rise of the frame 37 measured at the side plates 38a and 38b.

In FIG. 6A, the curve designated by "A1" indicates the temperature for the case in which the foregoing FC sheet is employed for the members 42a and 42b, while the curve designated by "B1" indicates the temperature for the case in which no such members 42a and 42b are used. In FIG. 6B, the curve designated by "A2" indicates the temperature of the frame 37 when the thermally conductive elastic members 42a and 42b are used, while the curve designated by "B2" indicates the temperature where no such members 42a and 42b are used. As will be seen clearly in FIG. 6A, the temperature of the housing member 33 is held low when the thermally conductive elastic members 42a and 42b are used. On the other hand, FIG. 6B indicates that the temperature of the frame 37 is higher when the members 42a and 42b are used, as compared with the case where no such members 42a and 42b are used, indicating an efficient heat transfer from the interior of the housing 33 to the frame 37.

Thus, by using the thermally conductive elastic members 42a and 42b, it is possible to improve the efficiency of heat dissipation of the magnetic disk drive significantly, and the temperature rise of the magnetic disk drive is suppressed.

Thereby, the problems such as off-tracking or deterioration of various parts of the magnetic disk drive associated with the temperature rise is eliminated. It should be further noted that the present invention simultaneously achieves the absorption of vibration by filling the space between the disk drive and the frame by means of the foregoing thermally conductive elastic members 42a and 42b. Although not illustrated, it should be noted that one can further increase the dissipation of heat by filling the triangular space formed between the corner of the housing member 33 and the frame 37 where the support flange 41 is located.

Figure 7:
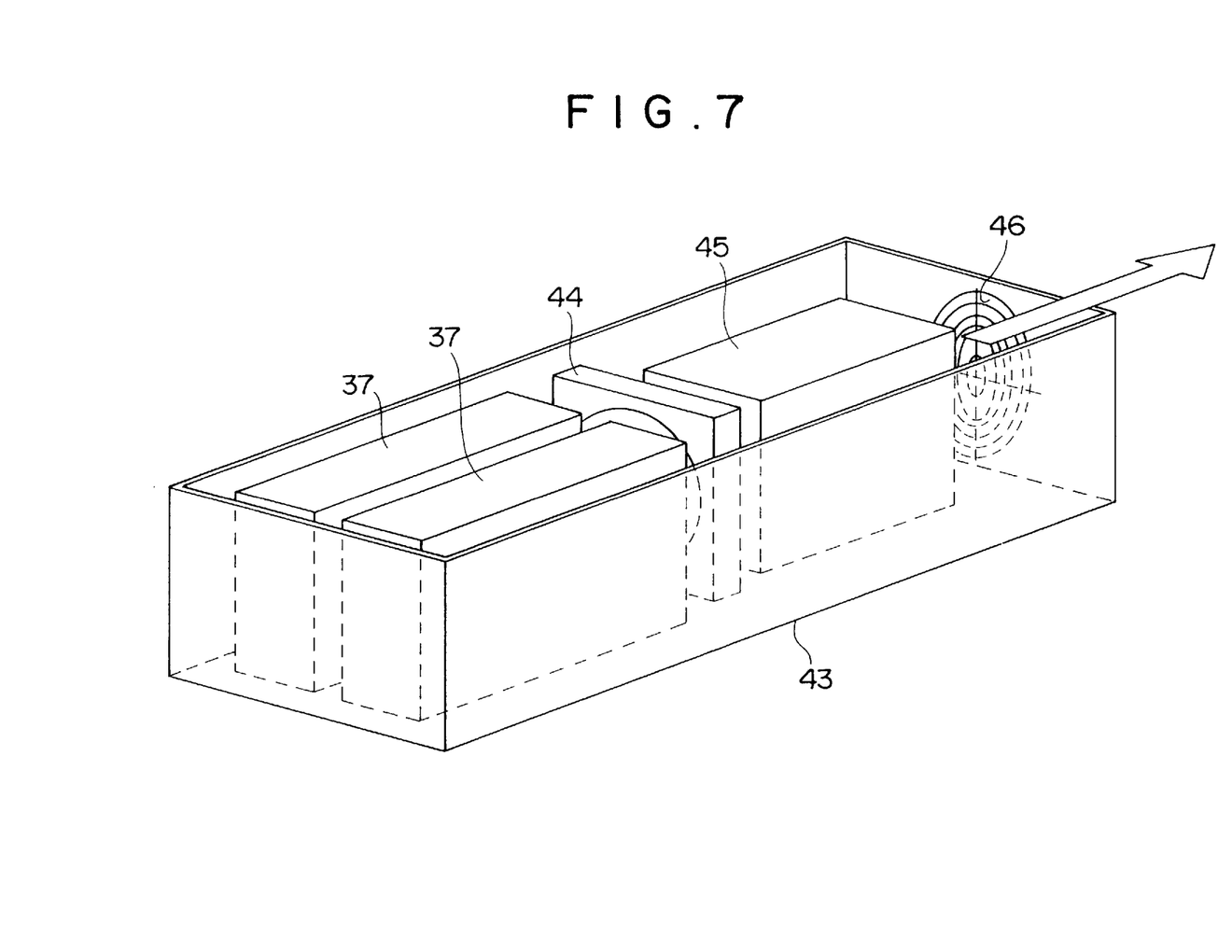
FIG. 7 is a diagram showing the construction of a disk module formed by the disk drive of the present invention.

FIG. 7 shows the construction of a disk module 43 to which the present invention is applicable.

Referring to FIG. 7, the disk module 43 includes the frame 37 described with reference to FIGS. 5A–5C in plural numbers, wherein each of the frames 37 carries thereon a magnetic disk drive 31 described already such that the frames 37 are disposed side by side. Further, a power unit 45 is disposed in the downstream side of the cooling air flow that is exhausted from an air outlet 46 as indicated by the arrow in FIG. 7 by means of a cooling fan 44. Thereby, the heat radiated from the frames 37 as well as the heat radiated from the power unit 45 are removed effectively by the cooling air that is exhausted from the air outlet 46 by the cooling fan 44.

Figure 8A:
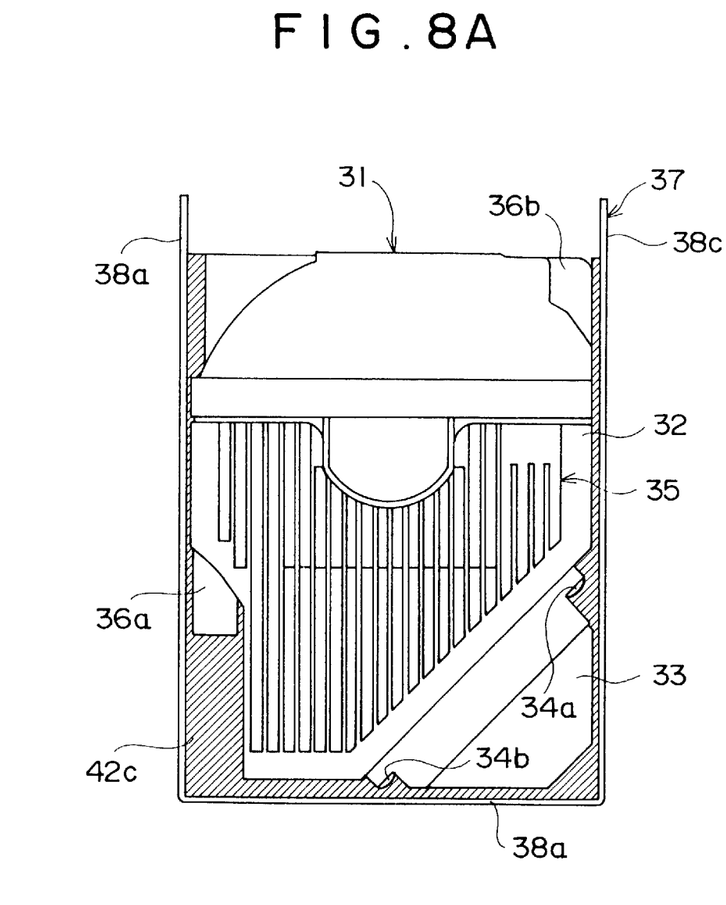
FIGS. 8A and 8B are diagrams showing a magnetic disk drive according to a second embodiment of the present invention.
Figure 8B:
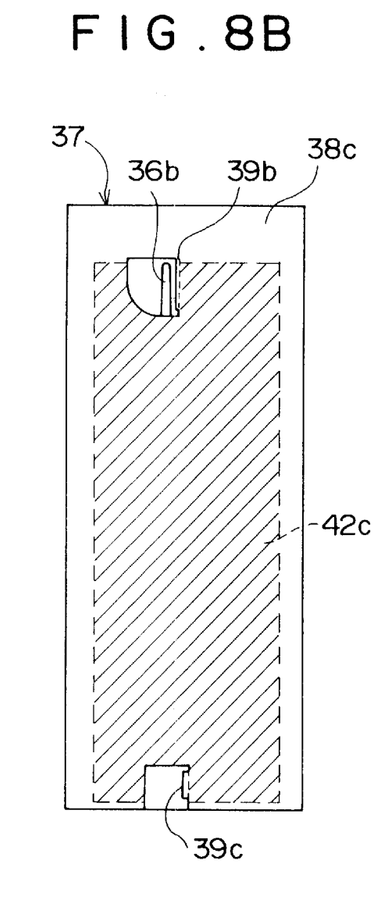

Next, a second embodiment of the present invention will be described with reference to FIGS. 8A and 8B, wherein FIG. 8A shows a plan view while FIG. 8B is a side view. In FIGS. 8A and 8B, those parts corresponding to the parts described previously are designated by the same reference numerals and the description thereof will be omitted.

In the construction of FIGS. 8A and 8B, no threaded holes are formed in the flange parts 36a and 36b of the magnetic disk drive 31, and the housing member 33 does not carry the support flange 41. Further, it should be noted that the support flanges 39a–39c do not carry the vibration insulators 40a–40c. On the other hand, the present embodiment employs a thermally conductive elastic member 42c to surround the first and second housing members 32 and 33 and to fill the space between the magnetic disk drive 31 and the frame 37. More specifically, the thermally conductive elastic member 42c is formed of a rubber composite similar to the one that forms the elastic members 42a and 42b, and is attached to the magnetic disk drive 31 to surround the same continuously and further to the frame 37 by way of adhesive. In other words, the magnetic disk drive 31 is mounted firmly upon the frame 37 via the thermally conductive elastic member 42c. According to the construction of the present embodiment, the flanges 36a and 36b or the mounting bracket 41 of the disk drive housing do not contact to the corresponding support flanges 39a–39c directly, and one can eliminate the vibration insulators 40a–40c. Associated with this, one can eliminate the support flanges 39a–39c from the frame 37.

In the present embodiment, not only the heat inside the second housing member 33 but also the heat inside the first housing member 32 can be dissipated to the frame 37 via the thermally conductive elastic member 42c. Thereby, the efficiency of heat dissipation is improved further, while simultaneously maintaining excellent acoustic insulation by absorbing any vibration or shock applied externally to the frame 37. Further, such a construction is effective for insulating acoustic noise formed inside the housing of the magnetic disk drive as a result of movement of the actuator 11.

It should be noted that the construction of the housing of the magnetic disk drive is not limited to the embodiments described heretofore. For example, the housing of the magnetic disk drive may be formed of a single housing member rather than forming the same from the two housing members 32 and 33. In this case, the thermally conductive elastic members 42a and 42b should be provided upon a part of the housing that covers the voice coil motor 18 where the heat generation is maximum.

Further, the present invention is not limited to the embodiments described heretofore but various variations and modifications may be made without departing from the scope of the invention.

What is claimed is:

1. A disk drive for storing information, comprising:

a rotatable medium having a recording surface for recording information;

a spindle motor for causing a rotation of said rotatable medium;

a head for scanning over said recording surface of said rotatable medium, said head causing a recording and/or reproduction of information on and from said recording surface of said rotatable medium;

an actuator mechanism for causing said head to scan over said recording surface of said rotatable medium;

a housing for enclosing said rotatable medium, said head and said actuator mechanism hermetically, said housing including a corner part defined by first and second side walls;

a frame for holding said housing; and a thermally conductive elastic member interposed between said housing and said frame for absorbing vibration, said actuator mechanism including a voice coil motor provided in said corner part of said housing, said thermally conductive elastic member covering at least a portion of at least one of said first and second side walls of said housing and further contacting said frame for conducting heat inside said housing to said frame, said thermally conductive elastic member being a sheet-like member having a thermal conductivity greater than 1 W/m ° C.

2. A disk drive as claimed in claim 1, wherein said thermally conductive elastic member is further provided to substantially completely fill a space formed between said housing and said frame.

3. A disk drive as claimed in claim 1, wherein said housing comprises a first housing part for covering said rotatable medium and a second, separate housing part for covering said actuator mechanism, said first housing part and said second housing part forming together a hermetically sealed space corresponding to said housing, for accommodating said rotatable medium and said actuator mechanism therein.

4. A disk drive as claimed in claim 3, wherein each of said first and second housing parts is mounted upon a corresponding support point of said frame via a vibration insulator, and wherein said thermally conductive elastic member fills a space formed between said second housing part and said frame.

5. A disk drive as claimed in claim 1, wherein said thermally conductive elastic member is formed of an acoustic insulating material.

6. A disk drive as claimed in claim 1 wherein said thermally conductive elastic member is covering at least a portion of both said first side wall and said second side wall.

7. A disk drive as claimed in claim 6 wherein said thermally conductive elastic member is comprised of at least two separate members, with a first member covering at least a portion of said first side wall and a second member covering at least a portion of said second side wall.

8. A frame structure of a disk drive for mounting a disk drive housing on a frame, comprising:

a disk drive housing for accommodating therein: a rotatable medium that carries information on a recording surface; a head for scanning said recording surface, said head causing a recording and/or reproduction of information on and from said recording surface of said rotatable medium; and an actuator mechanism for causing said head to scan over said recording surface of said rotatable medium, said actuator mechanism including a voice coil motor provided in a corner part of said disk drive housing defined by first and second side walls;

a frame for holding said housing; and a thermally conductive elastic member interposed between said housing and said frame for absorbing vibration, said thermally conductive elastic member covering at least a portion of at least one of said first and second side walls and further contacting said frame;

said thermally conductive elastic member further conducting heat inside said housing to said frame;

said thermally conductive elastic member being a sheet-like member having a thermal conductivity greater than 1 W/m ° C.

9. A frame structure as claimed in claim 8 wherein said thermally conductive elastic member is covering at least a portion of both said first side wall and said second side wall.

10. A frame structure as claimed in claim 9 wherein said thermally conductive elastic member is comprised of at least two separate members, with a first member covering at least a portion of said first side wall and a second member covering at least a portion of said second side wall.

11. A disk drive for storing information, comprising:

a rotatable medium having a recording surface for recording information;

a spindle motor for causing a rotation of said rotatable medium;

a head for scanning over said recording surface of said rotatable medium, said head causing a recording and/or reproduction of information on and from said recording surface of said rotatable medium;

an actuator mechanism for causing said head to scan over said recording surface of said rotatable medium;

a housing for enclosing at least said rotatable medium, said head and said actuator mechanism hermetically, said housing including a corner part defined by first and second side walls;

a frame for holding said housing; and a sheet-like thermally conductive elastic member interposed between said housing and said frame for absorbing vibration, said actuator mechanism including a voice coil motor provided in said corner part of said housing;

said thermally conductive elastic member covering at least a portion of at least one of said first and second side walls of said housing and further contacting said frame for conducting heat inside said housing to said frames, said thermally conductive elastic member having a thermal conductivity of about 1.26 W/m ° C or more.

12. A disk drive as claimed in claim 11, wherein said thermally conductive elastic member is further provided to substantially completely fill a space formed between said housing and said frame.

13. A disk drive as claimed in claim 11, wherein said housing comprises a first housing part for covering said rotatable medium and a second, separate housing part for covering said actuator mechanism, said first housing part and said second housing part forming together a hermetically sealed space corresponding to said housing, for accommodating said rotatable medium and said actuator mechanism therein.

14. A disk drive as claimed in claim 13, wherein each of said first and second housing parts is mounted upon a corresponding support point of said frame via a vibration insulator, and wherein said thermally conductive elastic member fills a space formed between said second housing part and said frame.

15. A disk drive as claimed in claim 11, wherein said thermally conductive elastic member is formed of an acoustic insulating material.

16. A disk drive as claimed in claim 11 wherein said thermally conductive elastic member is covering at least a portion of both said first side wall and said second side wall.

17. A disk drive as claimed in claim 16 wherein said thermally conductive elastic member is comprised of at least two separate members, with a first member covering at least a portion of said first side wall and a second member covering at least a portion of said second side wall.

* * * * *